United States Patent
Akiyama

(10) Patent No.: US 10,867,394 B2
(45) Date of Patent: Dec. 15, 2020

(54) OBJECT TRACKING DEVICE, OBJECT TRACKING METHOD, AND RECORDING MEDIUM

(71) Applicant: NEC Corporation, Tokyo (JP)

(72) Inventor: Tatsuo Akiyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 105 days.

(21) Appl. No.: 16/301,783

(22) PCT Filed: May 11, 2017

(86) PCT No.: PCT/JP2017/017846
§ 371 (c)(1),
(2) Date: Nov. 15, 2018

(87) PCT Pub. No.: WO2017/199840
PCT Pub. Date: Nov. 23, 2017

(65) Prior Publication Data
US 2019/0156491 A1    May 23, 2019

(30) Foreign Application Priority Data

May 18, 2016   (JP) .................................. 2016-099404

(51) Int. Cl.
*G06T 7/20*      (2017.01)
*H04N 7/18*      (2006.01)
*G06T 7/246*     (2017.01)

(52) U.S. Cl.
CPC .............. *G06T 7/20* (2013.01); *G06T 7/246* (2017.01); *G06T 2207/10016* (2013.01); *G06T 2207/30196* (2013.01); *G06T 2207/30241* (2013.01); *H04N 7/18* (2013.01)

(58) Field of Classification Search
CPC . G06T 7/20; G06T 7/246; G06T 2207/10016; G06T 2207/30196; G06T 2207/30241; H04N 7/18
See application file for complete search history.

(56) References Cited

U.S. PATENT DOCUMENTS

| 2005/0254686 A1 | 11/2005 | Koizumi |
| 2009/0002489 A1* | 1/2009 | Yang ...................... G06K 9/621 |
| | | 348/143 |
| 2016/0092739 A1 | 3/2016 | Oami et al. |

FOREIGN PATENT DOCUMENTS

| JP | H06-169458 A | 6/1994 |
| JP | 2003-256843 A | 9/2003 |
| JP | 2004-096402 A | 3/2004 |
| JP | 2006-190121 A | 7/2006 |
| JP | 2006-250918 A | 9/2006 |

(Continued)

OTHER PUBLICATIONS

McKenna et al, "Tracking Groups of People" (published in Computer Vision and Image Understanding 80, pp. 42-56, 2000).*

(Continued)

*Primary Examiner* — Casey L Kretzer

(57) ABSTRACT

An object tracking means tracks objects in a video image. An object consolidation determination means generates a "container" which includes a plurality of objects located in proximity. When an object separation determination means determines that an object is released from the "container", the object tracking means restarts tracking the object released from the "container".

8 Claims, 10 Drawing Sheets

ACTUAL POSITIONAL RELATIONSHIP AMONG TRACKERS

GRAPHICAL REPRESENTATION

(56) References Cited

FOREIGN PATENT DOCUMENTS

| JP | 2007-272436 A | 10/2007 |
| JP | 2016-071830 A | 5/2016 |
| WO | 2014/192483 A1 | 12/2014 |

OTHER PUBLICATIONS

Dockstader et al, "Tracking Multiple Objects in the Presence of Articulated and Occluded Motion" (published in Proceedings Workshop on Human Motion, pp. 88-95, Dec. 2000).*

Gabriel et al, "The State of the Art in Multiple Object Tracking Under Occlusion in Video Sequences" (published 2003).*

International Search Report for PCT Application No. PCT/JP2017/017846, dated Aug. 8, 2017.

English translation of Written opinion for PCT Application No. PCT/JP2017/017846.

* cited by examiner

OBJECT TRACKING DEVICE, OBJECT TRACKING METHOD, AND RECORDING MEDIUM

This application is a National Stage Entry of PCT/JP2017/017846 filed on May 11, 2017, which claims priority from Japanese Patent Application 2016-099404 filed on May 18, 2016, the contents of all of which are incorporated herein by reference, in their entirety.

TECHNICAL FIELD

The present invention relates to an object tracking device, an object tracking method, and an object tracking program, and particularly relates to an object tracking system, an object tracking method, and an object tracking program, being capable of accurately tracking an object, even when occlusion occurs among objects of tracking targets.

BACKGROUND ART

In recent years, regarding tracking of a target object in a moving image, a technique for enabling tracking of the object, even when an occluding object that occludes the object is present, is proposed. Note that, in the present specification, as far as there is no misunderstanding particularly, an "object" and a "thing" are treated as words having a same connotation. Specifically, it is assumed that a tracking target includes a person and the like, for example, in addition to a so-called "thing".

For example, PTL 1 proposes a method in which abnormality of object tracking processing is detected by comparing a likelihood of a tracking target with a predetermined threshold value, then, when it is detected to be normal, an original target to be detected is tracked, and when it is detected to be abnormal, tracking is continued by shifting a tracking target from the original target to an occluding object.

PTL 2 proposes that, when an occluding object is an openable door installed on a wall of a building, a state (opening or closing) of the door is detected by image analysis, and a method for tracking an object is changed, based on a detection result.

PTL 3 proposes a method in which a person captured by a camera within a predetermined area is tracked, and a tracking result is output as trajectory data. Note that PTL 4 describes a technique relating to a trajectory management system employing a radio frequency identifier (RFID) tag.

CITATION LIST

Patent Literature

[PTL 1] Japanese Unexamined Patent Application Publication No. 2007-272436
[PTL 2] International Publication No. WO2014/192483
[PTL 3] Japanese Unexamined Patent Application Publication No. 2003-256843
[PTL 4] Japanese Unexamined Patent Application Publication No. 2006-250918

SUMMARY OF INVENTION

Technical Problem

However, in the method described in PTL 1, although among a plurality of independently moving objects, a case where one object (first object) occludes another object (second object) is assumed, a case where the second object also occludes the first object (hereinafter, also referred to as mutual occlusion) is not assumed. Generally, when occlusion occurs, prediction accuracy on a position of an object is deteriorated even if a temporal prediction model is incorporated in a tracking process. This means that a probability that object tracking processing returns from "abnormal" to "normal" decreases.

In the method described in PTL 1, when a state of object tracking processing becomes abnormal, tracking is continued by shifting a tracking target to an occluding object, specifically, an object that is not a tracking target. For example, it is assumed that at a certain point of time "T", an object "A" occludes an object "B", and object tracking processing becomes "abnormal". In this case, since a tracking target after the point of time T is shifted from the object B to the object A, it may become to be difficult to accurately track the object B after the point of time T.

Further, the method described in PTL 2 is based on a premise that an occluding object is a door. Therefore, for example, when an object is a person, it is difficult to apply the method described in PTL 2 in order to track a person B, which is a moving object, occluded by a person A, which is also a moving object.

Further, the method described in PTL 3 is a technique for extracting a trajectory of a person displayed in a video image, and an occluding object is not considered. PTL 4 does not describe a technique for tracking an object included in a video image.

An object of the present invention is to provide an object tracking device, an object tracking method, an object tracking program, and the like being capable of accurately tracking an object, even when mutual occlusion occurs among the plurality of independently moving objects described above.

Solution to Problem

An aspect of the invention is an object tracking device. The object tracking device includes object detection means for detecting an object from a video image; object tracking means for performing tracking of the object, based on information on the object detected by the object detection means; object grouping determination means for determining a grouping of objects that are in a proximity state in which objects are close to one another among objects being tracked by the object tracking means; object separation determination means for determining that the proximity state of the grouping of objects ends, based on a determination result of the object grouping determination means; and object tracking correction means for correcting a tracking result of the object tracking means, based on a determination result of the object separation determination means.

An aspect of the invention is an object tracking method. The object tracking method includes detecting an object from a video image; performing tracking of the object, based on information on the detected object; determining a grouping of objects that are in a proximity state in which objects are close to one another among the objects being tracked; determining that the proximity state of the grouping of objects ends, based on a determination result of the grouping of objects; and correcting the tracking result, based on a determination result indicating that the proximity state of the grouping of objects ends.

An aspect of the invention is a recording medium having an object tracking program recorded thereon. The object tracking program causes a computer to execute: object detection processing of detecting an object from a video image; object tracking processing of performing tracking of the object, based on information on the object detected in the object detection processing; object grouping determination processing of determining a grouping of objects that are in a proximity state in which objects are close to one another among objects being tracked in the object tracking processing; object separation determination processing of determining that the proximity state of the grouping of objects ends, based on a determination result of the object grouping determination processing; and object tracking correction processing of correcting a tracking result of the object tracking processing, based on a determination result of the object separation determination processing.

Advantageous Effects of Invention

According to the present invention, it is possible to accurately track an object, even when mutual occlusion occurs among a plurality of independently moving objects.

EXAMPLE EMBODIMENT

Figure 1:
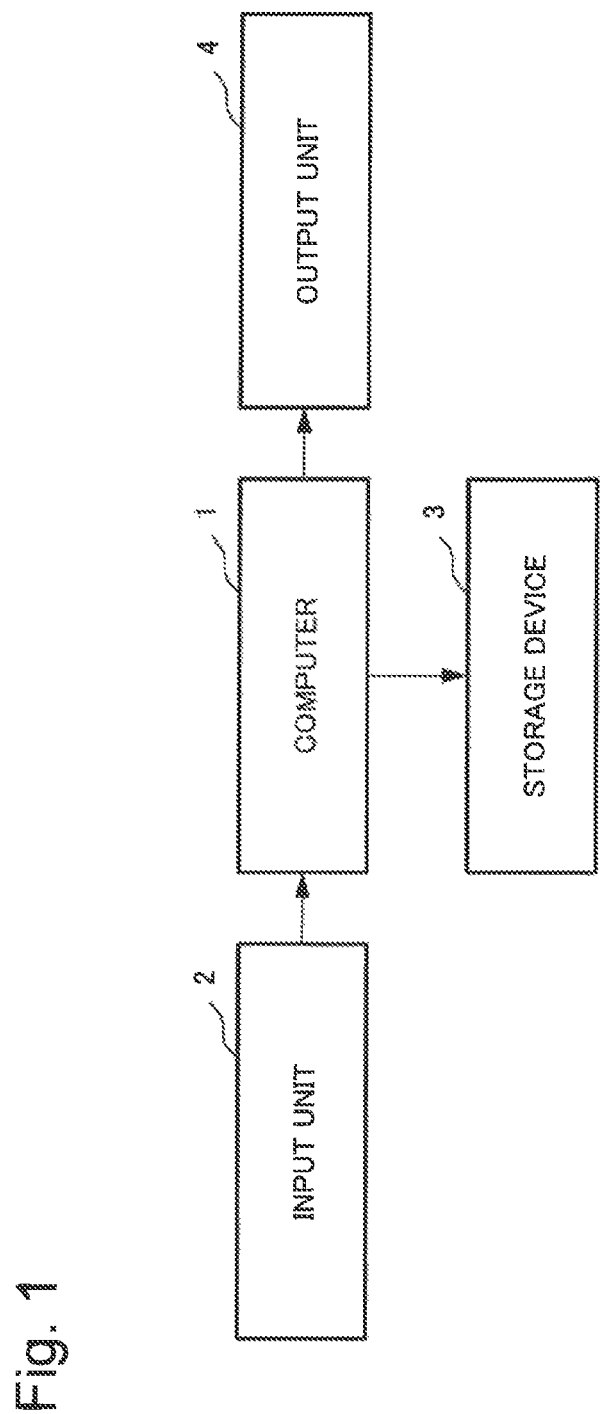
FIG. 1 is a block diagram illustrating an example of a system including an object tracking device according to an example embodiment of the present invention.

In the following, an example embodiment of the present invention is described with reference to the drawings. FIG. 1 is a block diagram illustrating an example of a system including an object tracking device according to the present example embodiment. The system exemplified in FIG. 1 includes a computer 1, an input unit 2, a storage device 3, and an output unit 4. The computer 1 is implemented by a central processing device, a processor, a data processing device, and the like, for example.
The computer 1 is an example of an object tracking device according to the present invention.

Figure 2:
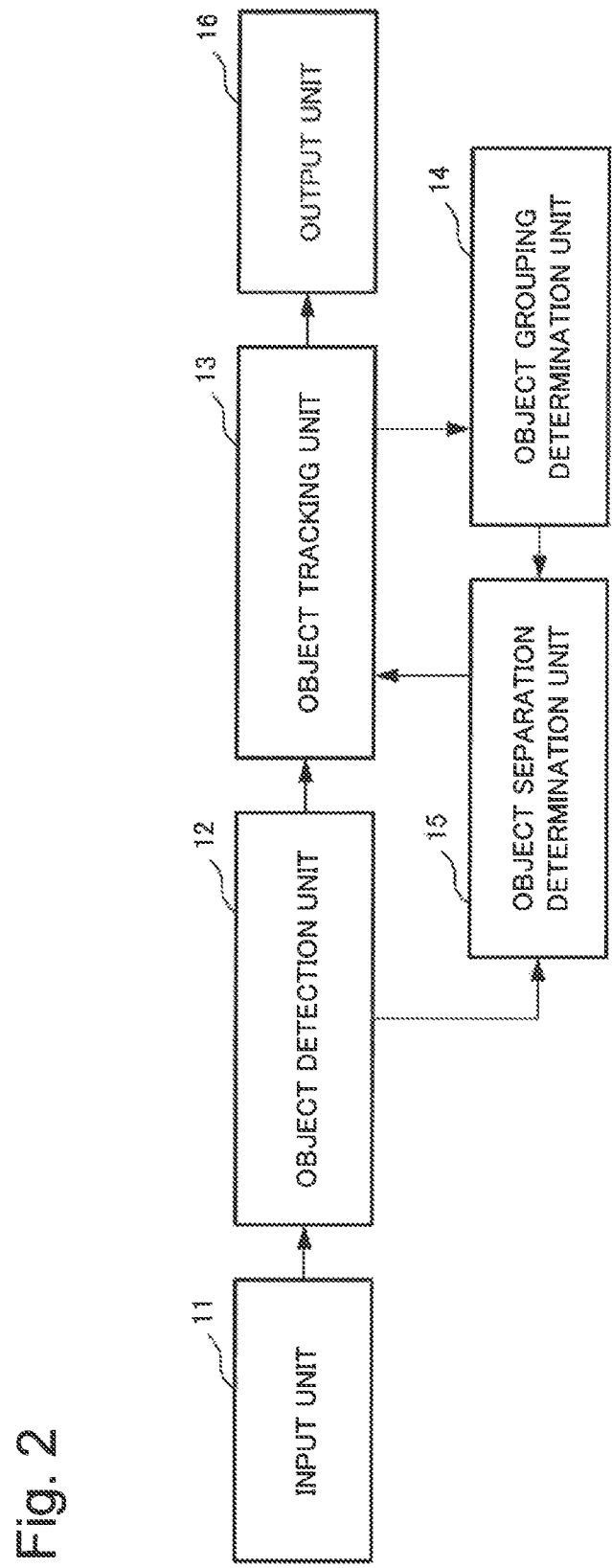
FIG. 2 is a block diagram illustrating an object tracking device according to an example embodiment of the present invention.

FIG. 2 is a block diagram illustrating an object tracking device according to the present example embodiment. The object tracking device according to the present example embodiment includes an input unit 11, an object detection unit 12, an object tracking unit 13, an object grouping determination unit 14, an object separation determination unit 15, and an output unit 16. Alternatively, the object tracking device itself may include the storage device 3 exemplified in FIG. 1. These configurations are respectively and schematically operated as follows.

The input unit 11 receives information such as a video image to be input from the input unit 2.

The object detection unit 12 analyzes a video image input from the input unit 11, and detects an object displayed (included) in the input image. Hereinafter, information detected by the object detection unit 12 may be referred to as object detection information.

The object tracking unit 13 tracks an object by using information on an object detected by the object detection unit 12, and information to be input from the object separation determination unit 15 to be described later.

Alternatively, the object tracking unit 13 may correct a tracking result. The object tracking unit 13 is an example of an object tracking correction means.

The object grouping determination unit 14 analyzes information on an object being tracked by the object tracking unit 13, detects objects present close to each other, and configures an object grouping. This object grouping can be treated as a grouping of objects in which mutual occlusion is likely to occur, in other words, a grouping of objects of which tracking is likely to fail. Hereinafter, information representing an object grouping configured by the object grouping determination unit 14 may be described as object grouping information.

The object separation determination unit 15 determines whether or not a certain object is separated from an object grouping by using object detection information output from the object detection unit 12, and object grouping information output from the object grouping determination unit 14.

In the present example embodiment, the object tracking unit 13 performs object tracking processing from an output result of the object detection unit 12, and the object grouping determination unit 14 detects a plurality of objects present close to each other by analyzing output information of the object tracking unit 13. Further, when it is determined that an object is separated from an object grouping, the object separation determination unit 15 feeds back a determination result to the object tracking unit 13. According to this configuration, the object tracking unit 13 is able to accurately track an object, even when occlusion of an object occurs. Note that concrete processing of each configuration will be described later.

Note that the input unit 11, the object detection unit 12, the object tracking unit 13, the object grouping determination unit 14, the object separation determination unit 15, and the output unit 16 are implemented by a computer 1 (CPU: Central Processing Unit) operating in accordance with a program (object tracking program).

For example, a program may be stored in the storage device 3, and the CPU may read the program, and operate as the input unit 11, the object detection unit 12, the object tracking unit 13, the object grouping determination unit 14, the object separation determination unit 15, and the output unit 16 in accordance with the program.

Alternatively, the input unit 11, the object detection unit 12, the object tracking unit 13, the object grouping determination unit 14, the object separation determination unit 15, and the output unit 16 may be respectively implemented by a dedicated hardware.

Figure 3:
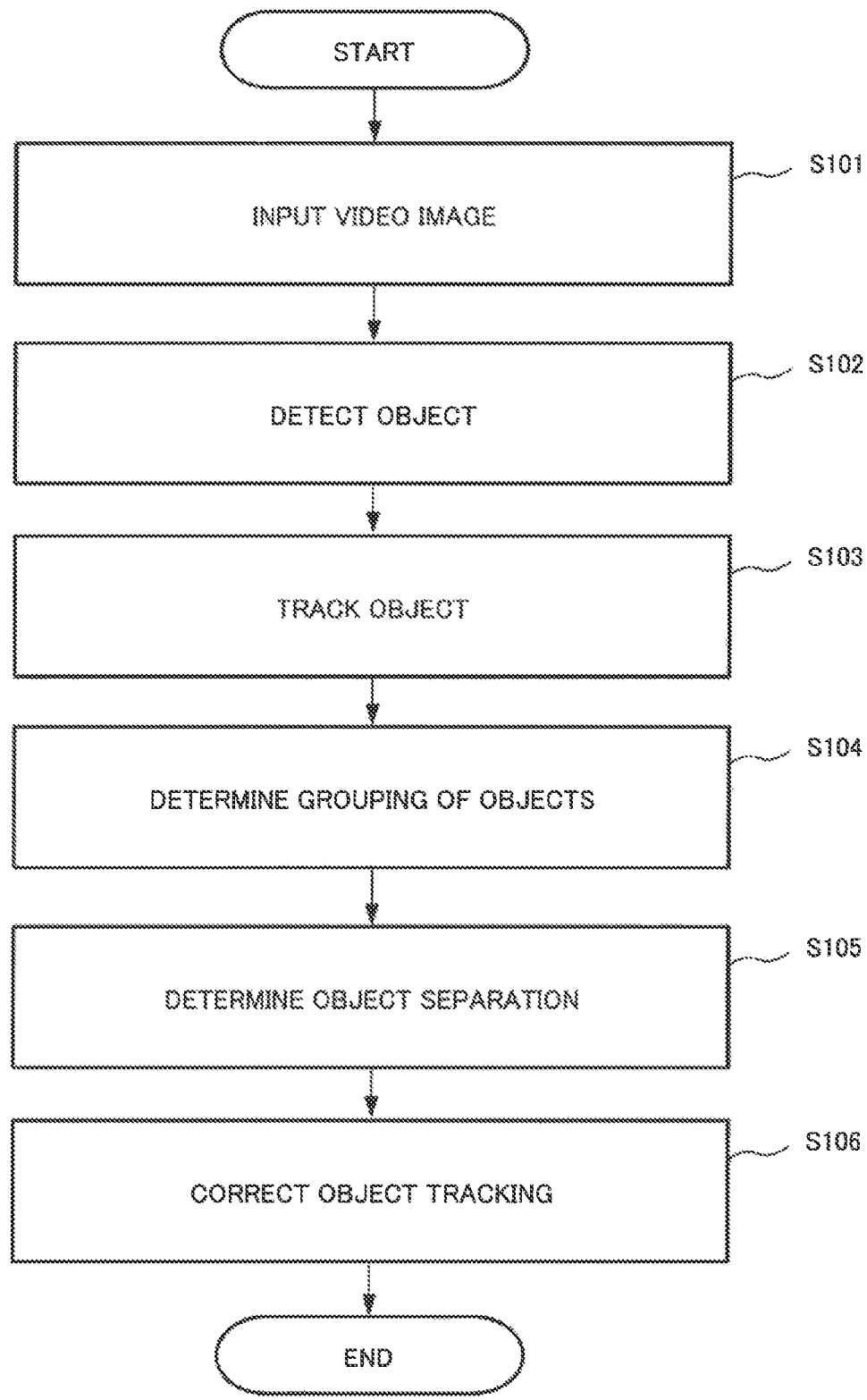
FIG. 3 is a flowchart illustrating an operation example of an object tracking device according to an example embodiment of the present invention.

FIG. 3 is a flowchart illustrating an operation example of an object tracking device in the present example embodiment. Note that, in the following example, it is assumed that a video image is input in a frame unit. It is assumed that each constituent element is able to write, in the storage device 3, a history, a parameter, and the like representing an object detection result, an object tracking result, an object grouping determination result, and an object separation determination result, as necessary. Further, it is assumed that each constituent element is able to update and refer to these written histories and parameters, as necessary.

First of all, a video image for use in object tracking is input to the object detection unit 12 via at least one of the input unit 2 and the input unit 11 (Step S101).

Next, the object detection unit 12 detects an object in the video image (Step S102). A method for detecting an object by the object detection unit 12 may be an existing method. The object detection unit 12 may detect an object by using a difference between a pre-registered background image, and an input video image, for example.

Alternatively, the object detection unit 12 may recognize one or more area images of detection candidates in a video image, as objects, by using a recognition dictionary relating to a pre-registered detection target, and generate object detection result based on the recognition. A detection candidate area image may be determined, based on the above-described difference image (e.g. an area where a difference is large, etc.), for example.

When the object tracking unit 13 has a time-series motion model, the object detection unit 12 may determine the detection candidate areas by predicting a position of an object displayed in a video image, from a position of the object in the past and the time-series model.

Alternatively, the object detection unit 12 may detect an object by shifting a window of an area having a predetermined size within an entire area in a video image, and comparing an image within each window with a recognition dictionary.

Next, the object tracking unit 13 tracks an object by comparing an object detection result output from the object detection unit 12, with a parameter relating to a position of an object at a time point earlier than a time point when the object is detected (Step S103). Specifically, the object tracking unit 13 performs tracking of an object, based on information on the object detected by the object detection unit 12.

Normally, tracking of an object is performed by using information referred to as a "tracker", which is inherent to each object. Specifically, first of all, the object tracking unit 13 refers to information (e.g. a position) indicating a state of a tracker at a time earlier than a detected time point, and an object detection result, and determines a pair of a tracker and an object to be associated, based on a distance between the tracker and the object, and the like, by an optimization method and the like.

Thereafter, the object tracking unit 13 updates tracker information by applying association information to an appropriate time-series model, and changing a value of a parameter included in the model. The object tracking unit 13 may employ an existing method, as a method for updating tracker information (information indicating a state of a tracker). The object tracking unit 13 may update tracker information, based on a state of a tracker in the past, and information on an object associated therewith, by using a Kalman filter, a particle filter, and the like, for example.

Information indicating a position of each object maybe information that can be calculated based on a detected object, and a content thereof is arbitrary. The object tracking unit 13 may use a coordinate value of a center point of a rectangle that circumscribes an object area, as information indicating a position of the object, for example. Alternatively, the object tracking unit 13 may use, as information indicating a position of an object, a median of x-coordinate values of the object-circumscribing rectangle in an x-direction, and a maximum value (or a minimum value) of y-coordinate values of the object-circumscribing rectangle in a y-direction.

Alternatively, when association (calibration) between an image coordinate and a three-dimensional space is performed in advance, the object tracking unit 13 may use, as object position information, information converted into a position in the three-dimensional space from a position on the image coordinate.

Note that the object tracking unit 13 may store an image feature calculated from an object area in association with a tracker, in addition to information indicating a position of an object.

Alternatively, the object tracking unit 13 may calculate a confidence measure regarding each tracker, and perform tracking by using the confidence measure. Specifically, the object tracking unit 13 may calculate a confidence measure depending on proximity of an object to be specified by each tracker. The object tracking unit 13 may use, as a confidence measure, an evaluation value of object detection, or an evaluation value computed by an optimization method for use when a tracker and an object are associated, for example. Alternatively, the object tracking unit 13 may use, as a confidence measure, a value acquired by scaling an evaluation value when the evaluation values indicate processes are performed well. Further alternatively, the object tracking unit 13 may use a duration (a number of frames) during which tracking of an object has succeeded, as a confidence measure, or use a new evaluation value calculated from these values, as a confidence measure.

Alternatively, the object tracking unit 13 may use, as a confidence measure, an index determined based on time-series information as to whether or not tracking of an object has succeeded. Specifically, the object tracking unit 13 may increase an index representing a confidence measure at a certain ratio when tracking of an object has succeeded, and may decrease an index representing a confidence measure at a certain ratio when tracking has failed. The object tracking unit 13 may determine a ratio at which an index representing a confidence measure is increased or decreased by considering an evaluation value of object detection.

Alternatively, the object tracking unit 13 may decrease a confidence measure of an object when a state that an evaluation value of object detection is poor is continued, instead of greatly lowering an evaluation value of a tracker when an evaluation value of object detection is temporarily poor. The object tracking unit 13 may delete a tracker itself, when a confidence measure becomes equal to or below a fixed value.

Note that a pair of a tracker and an object may not be necessarily acquired. For example, when a tracker is not present in the vicinity of a certain object, the object tracking unit 13 may not perform association between the tracker and an object (specifically, processing of specifying a pair of the tracker and an object). Further, the object tracking unit 13 may not perform association between a tracker and a certain detection object either, when it is predicted that no tracker is present in the vicinity of the object, as a result of predicting a position of each tracker by using tracker information at a time point in the past.

On the other hand, as a result of predicting a position of each tracker, when a plurality of trackers overlap each other, and one-to-one association between a tracker and a detected object is difficult, association between a tracker and an object is managed by using a container, which will be described later. In this case, although the object tracking unit 13 performs association between a tracker and a detected object, the association may include an error. In view of the above, as will be described later, this association is reviewed when an object is separated from a container. Until then, the object tracking unit 13 may associate a tracker with a plurality of objects possibly associated. Note that although a plurality of objects are present in such a case where objects overlap each other, only a part of the plurality of objects may be detected. In this case, the object tracking unit 13 may associate a detected object with two or more trackers.

This is because a tracker state can be updated by using information of another object different from the object with which the tracker has been associated during tracking if the object tracking unit 13 is forced to associate a tracker with an object, which causes erroneous tracking. Therefore, the object tracking unit 13 may update a tracker that is not associated with an object, based on solely a prediction result by a time-series model, for example.

Next, the object grouping determination unit 14 determines a grouping of objects including a plurality of objects in a mutually proximity state by detecting objects located close to each other (Step S104). The object grouping determination unit 14 may judge whether or not a plurality of objects are located close to each other by using a distance between objects on an image coordinate in a video image, for example. At this occasion, the object grouping determination unit 14 may set a distance between objects, as a distance between center points of rectangles that circumscribe the objects, for example. When a distance between objects is smaller than a predetermined value, the object grouping determination unit 14 may judge that these objects are a grouping of objects located close to each other.

In the following description, a grouping of objects or trackers located close to each other is referred to as a "container". When association between an image coordinate, and an actual three-dimensional position in a video image is performed in advance, the object grouping determination unit 14 may acquire a three-dimensional position for each object based on its existing region on the video image, and calculate a distance between objects, based on the position.

Figure 4:
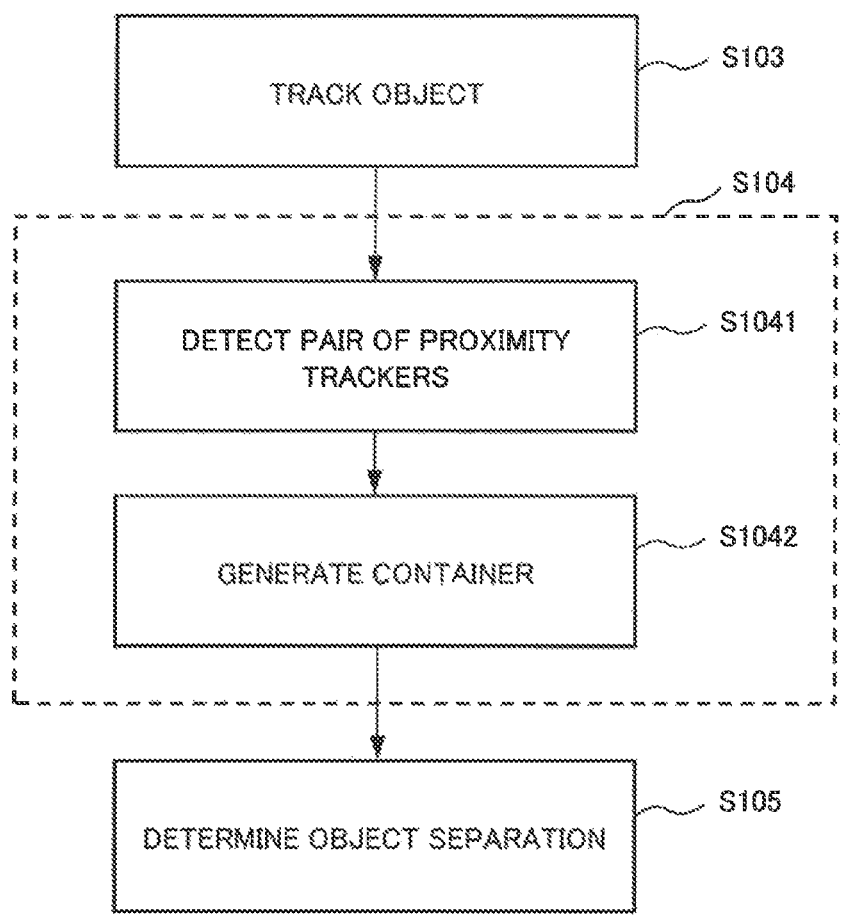
FIG. 4 is a flowchart illustrating an example of an operation of an object grouping determination unit.

Herein, processing of the object grouping determination unit 14 is described more concretely. FIG. 4 is a flowchart illustrating an example of an operation of the object grouping determination unit 14. However, a method for acquiring a container by the object grouping determination unit 14 is not limited to the method exemplified in FIG. 4.

First of all, the object tracking unit 13 acquires a combination of trackers placed at a close distance to each other (referred to as a pair of proximity trackers) among the trackers (Step S1041). The object tracking unit 13 may acquire a distance between trackers, for example, and determine that these trackers are close to each other, when a value of the acquired distance is smaller than a predetermined value.

Alternatively, the object tracking unit 13 may consider whether or not trackers overlap each other, in addition to a distance between a plurality of trackers. For example, although when a plurality of trackers are aligned side by side as viewed from a camera, overlapping does not occur, when a plurality of trackers are aligned in a depth direction as viewed from the camera, the trackers may overlap each other. When overlapping occurs among a plurality of trackers in an image, an association error between an object and a tracker is likely to occur. The object tracking unit 13 calculates overlapping of rectangles that circumscribe trackers, for example, and when the overlapping is equal to or larger than a fixed threshold value, the object tracking unit 13 may determine that a plurality of trackers overlap. However, a method for determining overlapping is not limited to the above, and the object tracking unit 13 can use various existing methods.

Figure 5:
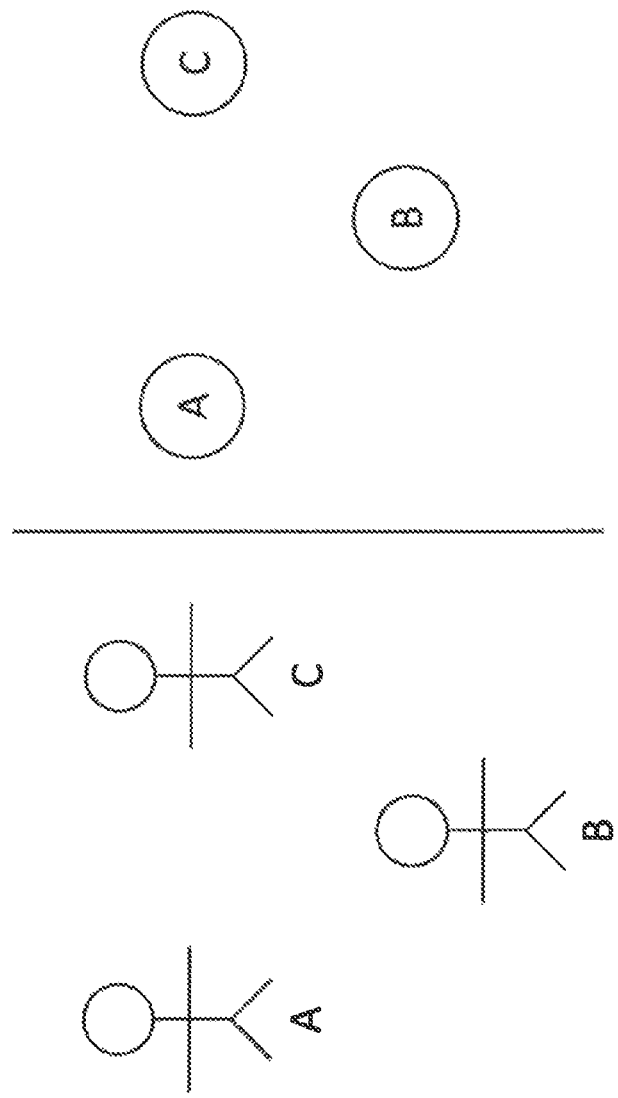
FIG. 5 is an explanatory diagram illustrating an example of a positional relationship among trackers and graphical representation.
Figure 6:
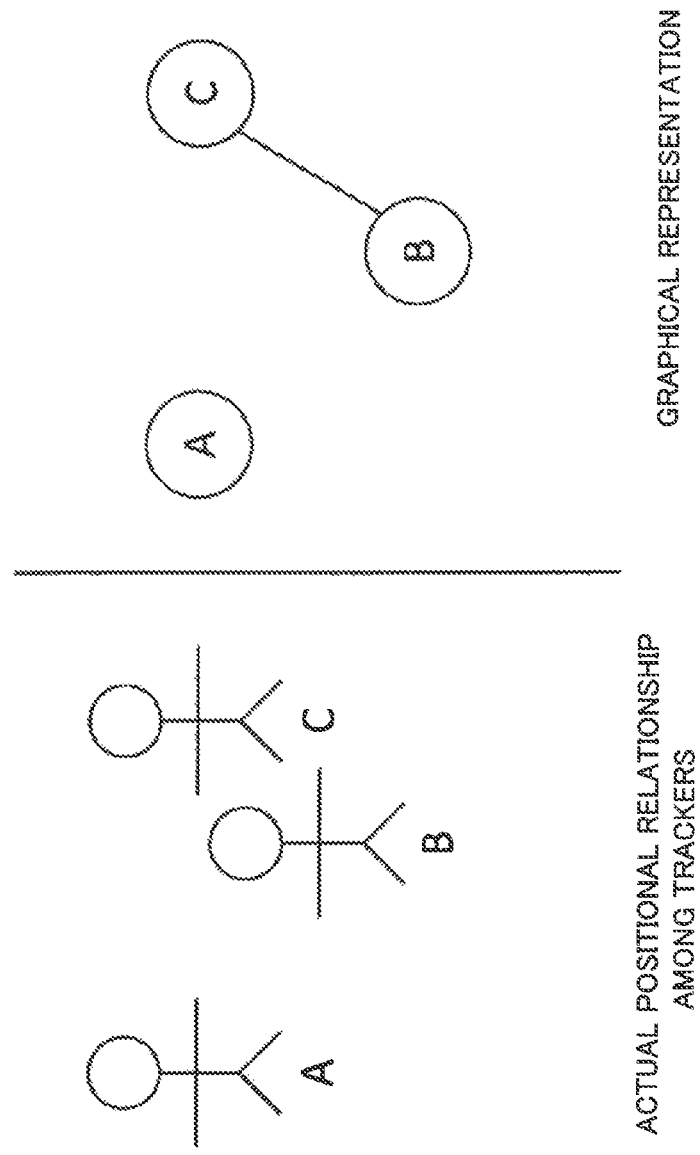
FIG. 6 is an explanatory diagram illustrating an example of a positional relationship among trackers and graphical representation.

FIG. 5 and FIG. 6 are explanatory diagrams illustrating examples of graphical representation of an actual positional relationship among trackers, and a positional relationship among the trackers. In the examples illustrated in FIG. 5 and FIG. 6, three trackers (trackers A, B, and C) are present. In FIG. 5, although the trackers A, B, and C are present, any of a distance between the tracker A and the tracker B, a distance between the tracker B and the tracker C, and a distance between the tracker C and the tracker A is larger than a given threshold value, and trackers placed at a close distance to each other are not present. On the other hand, in FIG. 6, a distance between the tracker B and the tracker C is smaller than a given threshold value.

As an appropriate method for illustrating a pair of trackers present close to each other, it is possible to employ a method in which an edge and a node for use in a graph theory are used. In this method, for example, a node represents a tracker, and when a distance between trackers is smaller than a predetermined value, the trackers are connected to each other.

For example, FIG. 5 illustrates a case where three nodes (trackers) A, B and C exist and there is no edge (a pair of trackers in a relationship close to each other). On the other hand, FIG. 6 illustrates a case where only the tracker B and the tracker C are close to each other, and the tracker B and the tracker C are connected to each other.

Figure 7:
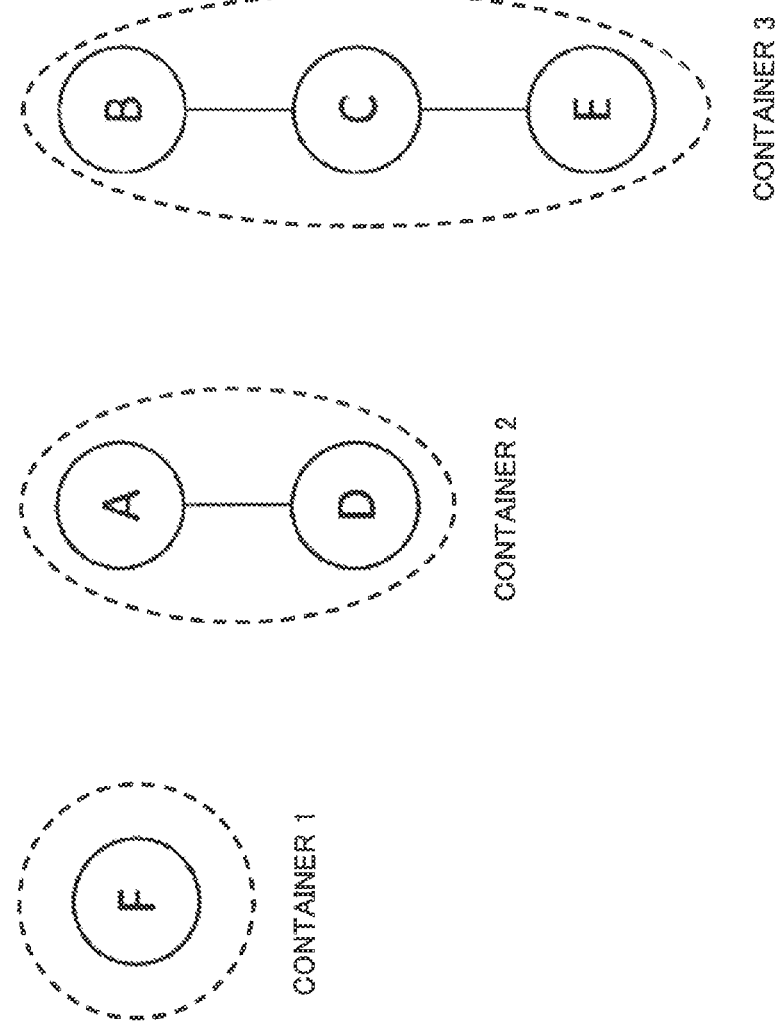
FIG. 7 is an explanatory diagram illustrating an example in which a positional relationship among trackers is graphically represented.

Next, the object grouping determination unit 14 generates a container (Step S1042 in FIG. 4). A method for generating a container is described by using graphical representation representing a positional relationship among trackers. FIG. 7 is an explanatory diagram illustrating an example of a container.

The object grouping determination unit 14 acquires a grouping of nodes (trackers) connected to each other, as one container. In the example illustrated in FIG. 7, there are three containers, i.e., a container constituted of a node (tracker) F, a container constituted of nodes (trackers) A and D, and a container constituted of nodes (trackers) B, C, and E.

In Step S1042, the object grouping determination unit 14 stores a number (container number) for identifying a generated container, and a number (tracker ID) for identifying a tracker included in each container in association with each other.

Further, the object grouping determination unit 14 also stores a feature of an object associated with a tracker in association with the container number, where the feature is used in object separation determination, which will be described later. Note that this feature is not limited to a feature of an object at this time point (time point when a container and a tracker are associated). The object grouping determination unit 14 may periodically extract and hold a feature from an object associated with a tracker in the past, and store a grouping of the time-series features in association with the container number. Alternatively, the object grouping determination unit 14 may store only a representative feature among time-series feature data obtained by summarizing resemble features, instead of directly storing the time-series features. In order to distinguish from container information in the past to be described later, information stored in association with a container number and a tracker ID is referred to as current container information.

The object grouping determination unit 14 may temporarily accumulate a determination result such that a grouping of proximity objects is present. Further, a grouping of objects may be tracked by determining sameness of combination of trackers belonging to a container included in an object grouping result obtained for each frame.

There may be a difference between trackers included in a same container associated among frames. A tracker present only in a past container is treated as a separation candidate tracker in object separation determination, which will be described later. On the other hand, a tracker present only in a current container is treated as a tracker newly merged in a container.

As illustrated in FIG. 3, after Step S104, the object separation determination unit 15 determines whether or not an object is separated from a container, based on a detection result of an object by the object detection unit 12 and information relating to a past container and a tracker belonging to the container (Step S105 in FIG. 3). In other words, the object separation determination unit 15 determines whether or not a grouping of objects ends, based on a determination result of the object grouping determination unit 14.

As described with respect to processing performed by the object tracking unit 13, if a tracker continues to be updated when a state that there is no association between an object and a tracker, or a state that a plurality of trackers are associated with one container continues, prediction errors accumulate and prediction accuracy on a position of an object is deteriorated. Further, also there is a possibility that the object tracking unit 13 erroneously associates past tracker information with a current object, which can cause a tracking error of an object (tracker switching).

In the present example embodiment, the object separation determination unit 15 compares information on a tracker belonging to a container in the past, with an object detection result at a current time point. A timing when comparison is performed is a time point when it is assumed that an association error between an object and a tracker hardly occurs though there has existed an object mutually close to the object in the past. The object separation determination unit 15 "separates" the object from the container, based on the comparison result and makes it possible to correctly track the object. Thus, it becomes possible to improve tracking accuracy of an object even when decrease of tracking accuracy is anticipated.

An example of a phenomenon that two objects pass each other is described with reference to FIG. 8. As exemplified in FIG. 8, two objects A and B approach each other from positions away from each other ("state 1" in FIG. 8), and then, a relationship such that the object A occludes the object B ("state 2" in FIG. 8) is established. When certain time elapses thereafter, the two objects are separated from each other ("state 3" in FIG. 8).

Figure 8:
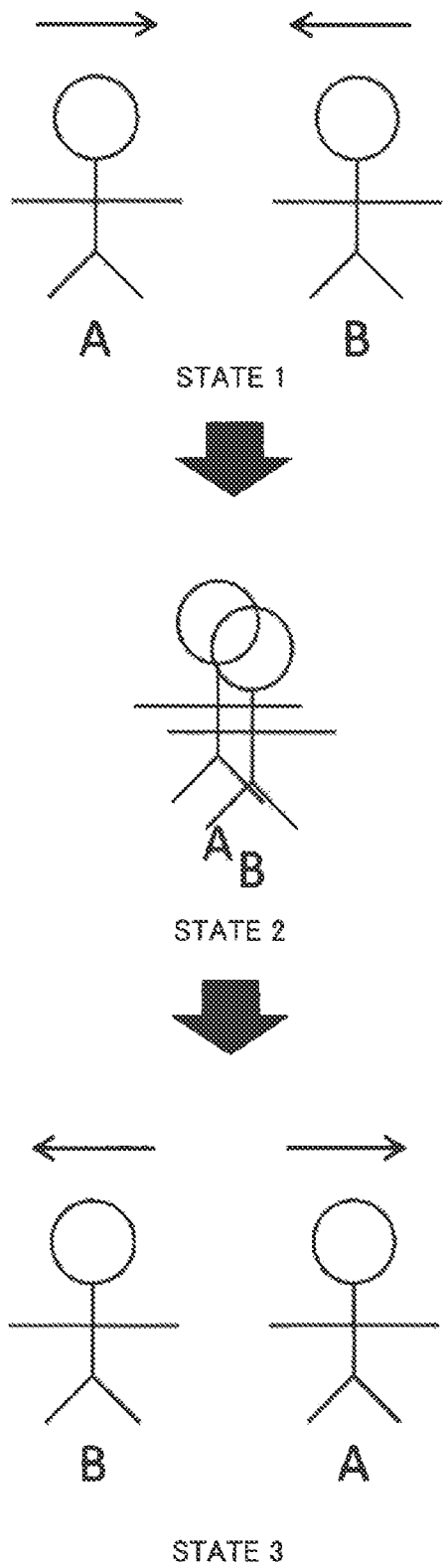
FIG. 8 is an explanatory diagram illustrating an example of a state that two objects pass each other.

In the "state 2" exemplified in FIG. 8, assume that occlusion between the objects A and B occurs and prediction errors of the tracker for the object B accumulate or the tracker is erroneously associated with the object A, which is not intrinsically associated. In the present example embodiment, the object separation determination unit 15 detects that the object B is separated from a container including the objects A and B at a time point when occlusion between the objects A and B ends ("state 3" in FIG. 8). Therefore, the object tracking unit 13 is able to accurately determine a correct tracker among trackers associated with the container, as a tracker that have been associated with the object B separated from the container, and to continue tracking of the objects A and B.

Figure 9:
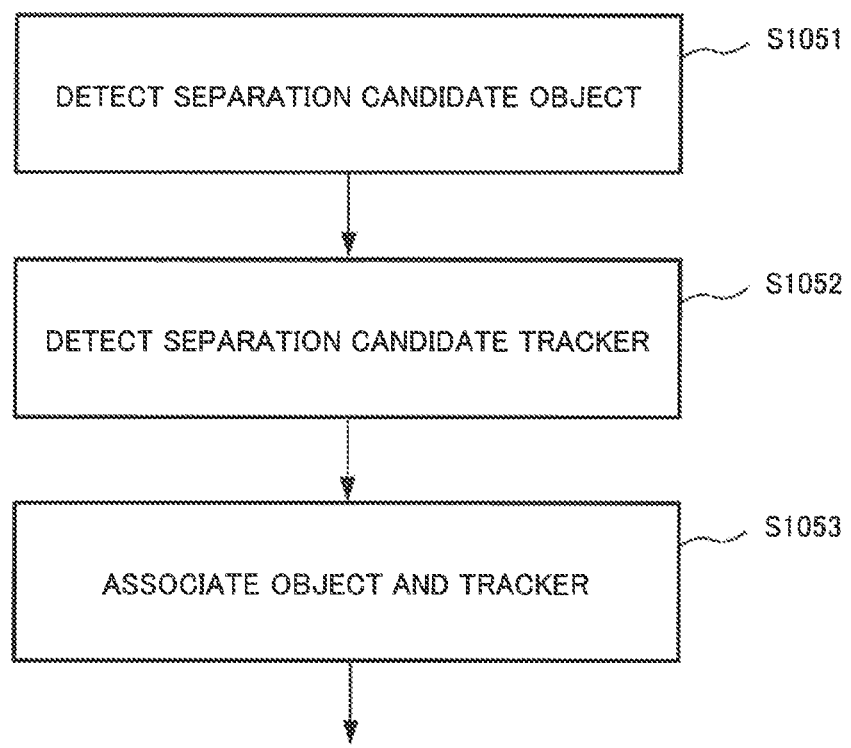
FIG. 9 is a flowchart illustrating an example of processing of detecting separation of an object.

Processing of Step S105 exemplified in FIG. 3 is described in more detail. FIG. 9 is a flowchart illustrating an example of processing of detecting separation of an object. First of all, the object separation determination unit 15 detects, as a separation candidate object, an object that is not associated with a tracker, or an object that is associated with a tracker, but is present at a position slightly away from a container, among objects detected by the object detection unit 12 (Step S1051).

Next, the object separation determination unit 15 detects, as a separation candidate tracker, a tracker that is associated with a container together with a plurality of trackers in the past (e.g. in an immediately preceding frame), but is singly associated with one container in a current frame (Step S1052). However, there is also a case where it is not possible to detect a separation candidate tracker. This case will be described later.

Thereafter, the object separation determination unit 15 associates a separation candidate object and a separation candidate tracker (Step S1053). Specifically, the object separation determination unit 15 associates an image area of the separation candidate object and an image area of the separation candidate tracker, based on a comparison result between the image areas. The object separation determination unit 15 may associate a separation candidate object and a separation candidate tracker which have a small difference between image areas, for example. Alternatively, after extracting an existing image feature from each image area, the object separation determination unit 15 calculates a distance (or a degree of similarity) between the extracted image features. Further, the object separation determination unit 15 associates a combination of a separation candidate object and a separation candidate tracker in which a distance between image features is smaller (larger) than a predetermined value. When a separation candidate tracker holds a time-series feature extracted in the past, or a representative feature acquired by aggregating these features, the object separation determination unit 15 may acquire a degree of similarity between a time-series feature in the past or a representative feature, and an image feature extracted from an image area of a separation candidate object by selecting the highest degree of similarity among values calculated for individual features.

The object separation determination unit 15 may calculate a known type feature as an image feature, a feature based on a luminance gradient or a color, for example. In the following description, a separation candidate object and a separation candidate tracker that are associated by the object separation determination unit 15 are respectively referred to as a separation object and a separation tracker.

When a tracker associated with a separation candidate object is a separation candidate tracker, the object separation determination unit 15 maintains the association as it is. On the other hand, when a tracker associated with a separation candidate object is not a separation candidate tracker, the object separation determination unit 15 compares the separation candidate object with the other trackers included in the container with which the separation candidate tracker has been associated in the past. As described above, the object separation determination unit 15 compares features between the separation candidate object and the trackers, and regards the tracker most similar to the separation candidate object as a separation tracker (in other words, having a highest degree of similarity in terms of feature) among all the trackers associated with the container, and replaces the tracker associated with the separation candidate object with the selected most similar tracker. However, only when a difference between a degree of similarity between the tracker most similar to the separation candidate object and the separation candidate object, and a degree of similarity between a currently selected separation candidate tracker and the separation candidate object is equal to or larger than a fixed value, the object separation determination unit 15 may replace the currently selected tracker with the most similar tracker.

When there is no separation candidate tracker and there is a tracker associated with a separation candidate object, the object separation determination unit 15 selects, as a separation candidate tracker, a tracker most similar to a separation candidate object in terms of feature, from among one or a plurality of trackers included in a container present near a separation candidate object, and associates the separation candidate object with the selected separation candidate tracker. Further, the object separation determination unit 15 deletes the selected separation candidate tracker from the container.

Alternatively, whether or not the separation candidate object is associated with a tracker, as described in Step S1053, the object separation determination unit 15 may select, as a separation candidate tracker, a tracker having a most similar feature with respect to a separation candidate object from among one or a plurality of trackers included in a container present near the separation candidate object, and may delete the selected separation candidate tracker from the container.

Alternatively, the object separation determination unit 15 may detect an area where image areas of objects overlap each other, and perform association of only a combination of an object and a tracker having an overlapping area equal to or larger than a predetermined area. Alternatively, the object separation determination unit 15 may perform association between an object and a tracker by limiting to a combination such that a distance between the object and the tracker become a value smaller than a predetermined distance.

As illustrated in FIG. 3, after Step S105, the object tracking unit 13 performs object tracking correction processing (Step S106 in FIG. 3). Specifically, the object tracking unit 13 updates information on a separation tracker by using information on a separation object in Step S105. Specifically, the object tracking unit 13 may initialize a parameter of a time-series model of a tracker, or use a parameter of the separation tracker without any update. Further, the object tracking unit 13 may update information on a separation tracker by using tracker information before occlusion occurred, in addition to information at a time point when separation is detected. Further, the object tracking unit 13 performs tracking of an object, based on these updated (corrected) results.

When one of separation object candidates is not associated with a separation tracker candidate, it is assumed that a new object appears in a video image. In this case, the object tracking unit 13 may generate a new tracker, based on an object detection result.

Note that a confidence measure is defined with respect to a tracker and updating a confidence measure may be adjusted so as to decrease a confidence measure of an object when a poor evaluation value of object detection continues. For example, the object tracking unit 13 may change a method of decreasing a confidence measure between each tracker that is associated with a container including a plurality of trackers, and the other trackers.

For example, it is preferable to more greatly decrease a confidence measure of a latter tracker (specifically, a tracker that is not associated with a container in association with a plurality of trackers) than a confidence measure of a former tracker (specifically, a tracker that is associated with a container in association with a plurality of trackers). This is because there is a possibility that a tracker that is not associated with an object, regardless of no other object existence in the vicinity thereof, is caused by an erroneous detection.

As described above, in the present example embodiment, the object detection unit 12 detects an object from a video image, and the object tracking unit 13 performs tracking of the object, based on information on the detected object. Further, the object grouping determination unit 14 determines a grouping of objects that are in a proximity state in which objects are close to each other from the objects being tracked, and the object separation determination unit 15 determines that the proximity state of the grouping of objects ends. Further, the object tracking unit 13 corrects a tracking result of the object. Therefore, even when mutual occlusion occurs among a plurality of independently moving objects (especially when objects are persons), it is possible to accurately track an object.

Specifically, in the present example embodiment, the object grouping determination unit 14 detects a container that is in a state that occlusion is likely to occur among a plurality of objects being tracked, and the object separation determination unit 15 detects that an object is separated from the container. Therefore, it is possible to improve tracking accuracy of an object, when occlusion between objects occurs.

Figure 10:
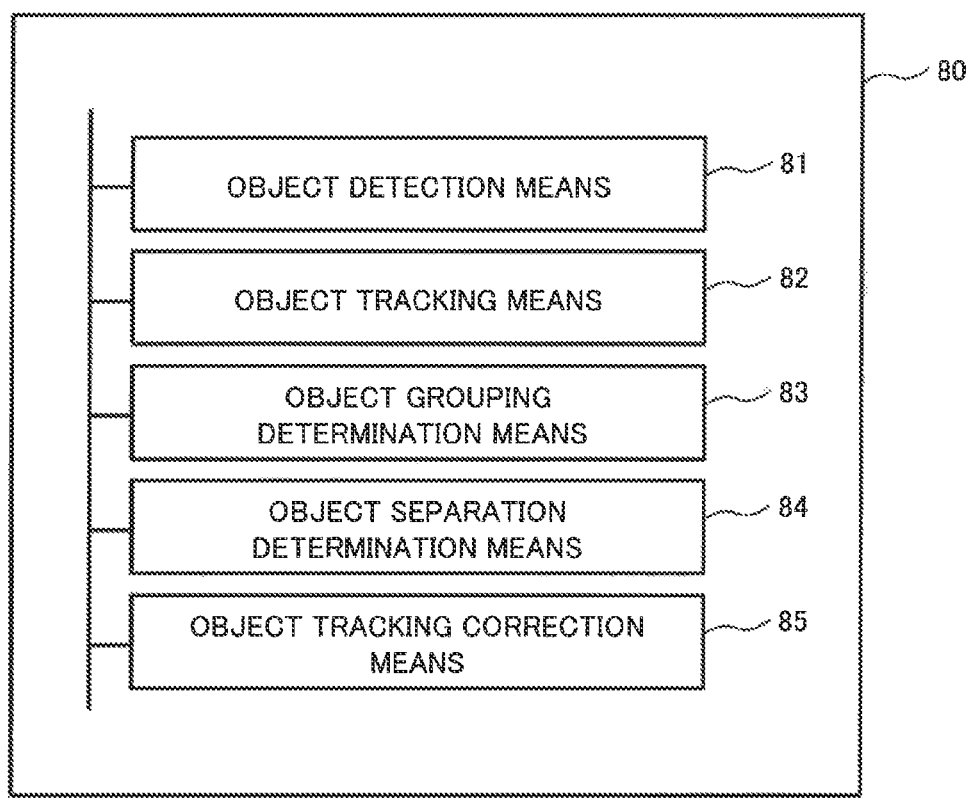
FIG. 10 is a block diagram illustrating an overview of an object tracking device according to an example embodiment of the present invention.

Next, an overview of a basic example embodiment according to an aspect of the present invention is described. FIG. 10 is a block diagram illustrating an overview of an object tracking device in the basic example embodiment. An object tracking device 80 in the basic example embodiment includes an object detection means 81 (e.g., corresponding to the object detection unit 12) for detecting an object (e.g., a person) from a video image. The object tracking device 80 includes an object tracking means 82 (e.g., corresponding to the object tracking unit 13) for performing tracking of an object (e.g., a tracker) detected by the object detection means 81, based on information on the object. The object tracking device 80 includes an object grouping determination means 83 (e.g., corresponding to the object grouping determination unit 14) for determining a grouping of objects (e.g., a container) that are in a proximity state in which objects are close to each other among objects being tracked by the object tracking means 82. The object tracking device 80 includes an object separation determination means 84 (e.g., corresponding to the object separation determination unit 15) for determining that the proximity state of the grouping of objects ends, based on a determination result of the object grouping determination means 83. The object tracking device 80 includes an object tracking correction means 85 (e.g., corresponding to the object tracking unit 13) for correcting a tracking result of an object by the object tracking means 82, based on a determination result of the object separation determination means 84.

According to this configuration, it is possible to accurately track an object, even when mutual occlusion among a plurality of independently moving objects (especially when objects are persons) being tracked occurs.

Alternatively, the object tracking means 82 may calculate a confidence measure of an object depending on closeness of the object with respect to another object. According to this configuration, it is possible to improve tracking accuracy of an object.

Alternatively, the object grouping determination means 83 may determine an identity of a grouping of objects. According to this configuration, the object grouping determination means 83 is able to track a grouping of objects.

Alternatively, the object tracking correction means 85 may correct a tracking result of the object tracking means 82, when it is determined that the proximity state of a grouping of objects ends by the object separation determination means 84. Further, the object tracking means 82 may perform tracking of an object, based on a corrected tracking result.

Alternatively, the object separation determination means 84 may detect, as a separation candidate tracker, a tracker that is associated with a container including a plurality of trackers in the past, and that is singly associated with one container in a current frame.

The above-described respective example embodiments are appropriately applicable to a system in which a trajectory of a person who is working is acquired from a video image captured by a camera, and promotion of work efficiency is suggested, for example. Further, the above-described respective example embodiments are appropriately applicable to video image monitoring, marketing in general, and the like in which trajectories of general customers and the like who move in a facility such as a shop are acquired. Further, the above-described respective example embodiments are appropriately applicable to marketing and the like in which the number of moving objects is counted by tracking movements of the moving objects displayed in a camera, for example.

In the foregoing, the present invention is described by the above-described example embodiment as an exemplary example. The present invention, however, is not limited to the above-described example embodiment. Specifically, it is possible to apply various aspects comprehensible to a person skilled in the art to the above-described example embodiment within the scope of the present invention.

This application is based upon and claims the benefit of priority based on Japanese patent application No. 2016-099404 filed on May 18, 2016, the disclosure of which is incorporated herein in its entirety by reference.

REFERENCE SIGNS LIST

1 Computer
2 Input unit
3 Storage device
4 Output unit
11 Input unit
12 Object detection unit
13 Object tracking unit
14 Object grouping determination unit
15 Object separation determination unit
16 Output unit

What is claimed is:

1. An object tracking device comprising:
a memory storing instructions; and
at least one processor configured to execute the instructions to perform;
detecting an object from a video image;
tracking of the object, based on information on the object detected and a tracker used for tracking the object;
determining a grouping of trackers associated with objects that are in a proximity state;
detecting a separation object separated from the grouping among the objects that are in the proximity state, based on a result of detecting the object;
detecting a separation tracker separated from the grouping, based on a result of the grouping of the trackers associated with the objects, or based on a similarity of a feature quantity between the separation object and a tracker in the grouping;
associating the separation object and the separation tracker when an object associated with the separation tracker is different from the separation object; and
correcting a tracking result of the object, based on the associating of the separation object and the separation tracker.

2. The object tracking device according to claim 1, wherein the at least one processor is configured to:
calculate a confidence measure of the object, depending on closeness of the object with respect to another object.

3. The object tracking device according to claim 1, wherein the at least one processor is configured to:
accumulate a determination result of a grouping of objects, and determines an identity of the grouping of objects.

4. The object tracking device according to claim 1, wherein the at least one processor is configured to:
detect, as a candidate of the separation tracker, a tracker that is associated with the grouping including a plurality of the trackers in a past frame of the video image, and that is singly associated with one grouping in a current frame of the video image.

5. An object tracking method comprising:
detecting an object from a video image;
performing tracking of the object, based on information on the detected object and a tracker used for tracking the object;
determining a grouping of trackers associated with objects that are in a proximity state;
detecting a separation object separated from the grouping among the objects that are in the proximity state, based on a result of detecting the object;
detecting a separation tracker separated from the grouping, based on a result of the grouping of the trackers associated with the objects, or based on a similarity of a feature quantity between the separation object and a tracker in the grouping;
associating the separation object and the separation tracker when an object associated with the separation tracker is different from the separation object; and
correcting the tracking result, based on the associating of the separation object and the separation tracker.

6. The object tracking method according to claim 5, further comprising
calculating a confidence measure of the object, depending on closeness of the object with respect to another object.

7. A non-transitory recording medium having an object tracking program recorded thereon, the object tracking program causing a computer to execute:
object detection processing of detecting an object from a video image;
object tracking processing of performing tracking of the object, based on information on the object detected in the object detection processing and a tracker used for tracking the object;

object grouping determination processing of determining a grouping of trackers associated with objects that are in a proximity state;

object separation detection processing of detecting a separation object separated from the grouping among the objects that are in the proximity state, based on a result of detecting the object;

tracker separation detection processing of detecting a separation tracker separated from the grouping, based on a result of the object grouping determination processing, or based on a similarity of a feature quantity between the separation object and a tracker in the grouping;

association processing of associating the separation object and the separation tracker when an object associated with the separation tracker is different from the separation object; and object tracking correction processing of correcting a tracking result of the object tracking processing, based on an association result of association processing.

8. The non-transitory recording medium having the object tracking program recorded thereon according to claim 7, wherein the object tracking processing includes processing of calculating a confidence measure of the object, depending on closeness of the object with respect to another object.

\* \* \* \* \*